May 17, 1932. C. W. SYMONDS 1,858,472
RAILWAY CROSSING
Filed Jan. 19, 1931
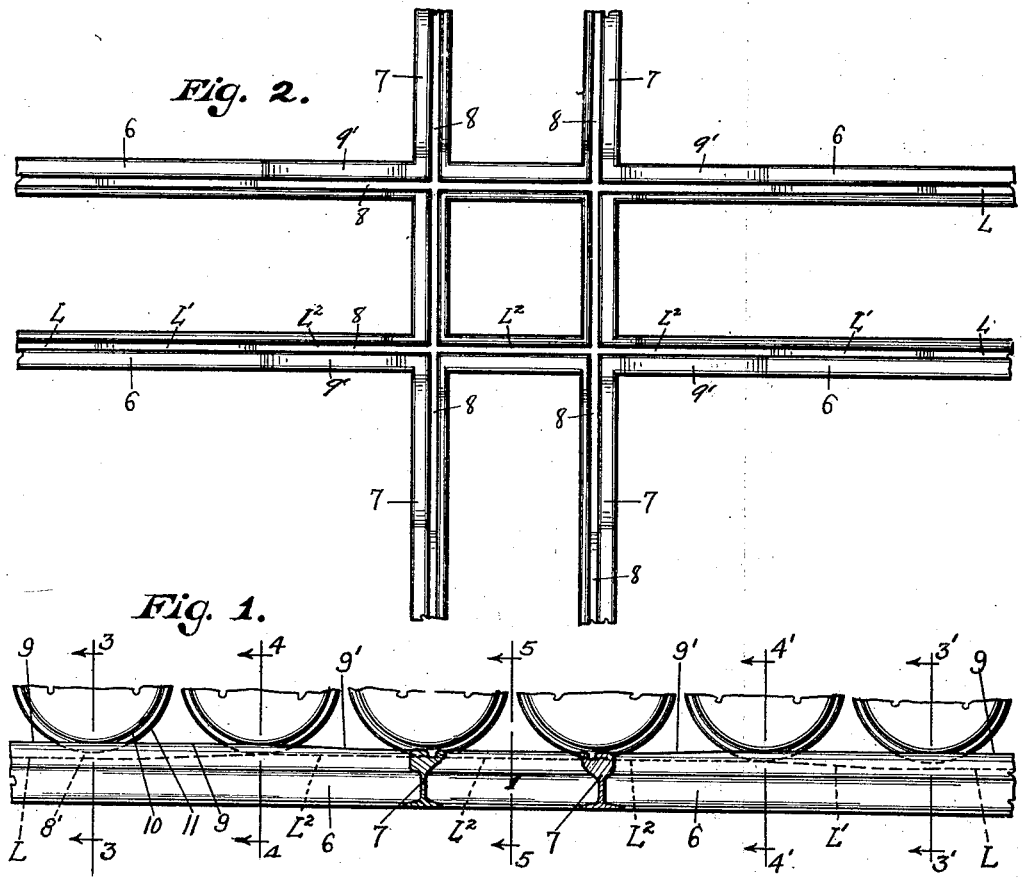
INVENTOR
BY
ATTORNEY Patented May 17, 1932

1,858,472

UNITED STATES PATENT OFFICE

CLEON W. SYMONDS, OF PASADENA, CALIFORNIA

RAILWAY CROSSING

Application filed January 19, 1931. Serial No. 509,630.

My invention relates to railway crossings and has for its principal object to provide a simple, practical and economical railway crossing of the type designed to eliminate or reduce to a minimum the noise caused by car wheels running over and across said railway crossings.

I am aware that many efforts have been made to provide a noiseless crossing and that patents have been issued for railway crossings in which the rail groove has been filled in at the intersection to take the load on the edge of the wheel flange as it runs over the crossing, which necessitates that the wheel must rise on the fill within the wheel groove to lift the tread of the wheel above the tread of the rail. I am also aware that it is old to taper off the top of the rail tread as it approaches the intersection to allow the wheel to descend until the weight of the wheel is transferred to the flange of the wheel and then after crossing the intersection the wheel raises until the weight is again carried on the tread of the wheel and the flange of the wheel is free of engagement with the groove in the rail. In both of these constructions the wheel and its load must either be raised and then lowered as it runs up over the fill in the rail groove, or it must be lowered and then raised again after it runs across the intersection.

I have conceived a railway crossing wherein the wheel and its load does not have to run down any incline or to run up any incline, thus avoiding the strain and additional friction necessitated by running a wheel, with its load, up an incline, whether it is running on the edge of the wheel flange, or on the tread of the wheel.

I accomplish this by tapering the bottom of the wheel groove upwardly, as it approaches an intersection, sufficiently to contact with the edge of the wheel flange, while the wheel tread is still in engagement with the tread of the rail, and this higher level of the rail groove is continued across the intersection and is then tapered down again to its normal level. But instead of continuing the upward incline of the fill within the groove sufficiently to lift the wheel by the flange of the wheel, I taper the rail tread from this point downwardly correspondingly and so as to allow the weight of the wheel to be transferred from the tread of the wheel on the tread of the tire to the flange of the wheel in the groove of the rail, and do it without raising the wheel with its load at any time. I have thus provided a simple and practical railway crossing without any moving parts and the complicated mechanism required for manipulating such parts, and I also eliminate the objectionable features of making it necessary for the wheel to run with its load up an incline in order to transfer the weight on the wheel from the tread of the wheel to the flange thereof.

In order to fully explain my invention, I have illustrated the same on the accompanying sheet of drawings, which I will now describe.

Figure 1 is a side elevation of a railway crossing illustrating the features constituting my invention;

Figure 2 is a plan view of a railway crossing embodying my invention;

Figure 3 is a vertical sectional view taken on line 3—3 of Fig. 1;

Figure 4 is a vertical sectional view taken on line 4—4 of Fig. 1; and

Figure 5 is a vertical sectional view taken on line 5—5 of Fig. 1.

Referring to the drawings more in detail, 6, 6, and 7, 7, designate the two pairs of rails of a railway crossing or intersection. The groove of the rail is designated 8, and the tread of the rail is designated 9. The tread of the wheel is designated 10, while the flange of the wheel is designated 11.

Referring to Figs. 1 and 3, it will be seen that normally there is a clearance between the bottom of the rail groove 8 and the edge of the wheel flange, this clearance or space being designated 8' in said figures. In said Fig. 1, the normal bottom level of the groove 5 is represented by the broken line L and it will be seen that from the section line 3—3, said line runs upwardly until at the section line 4—4 it is in engagement with the edge of the wheel flange 11, and that from this point the raised level $L^2$ of the bottom of the rail groove is continued across the intersection and to the section line 4'—4'; from which point it tapers downwardly, as at $L^1$, to its normal level L. The intersecting grooves 8, 8, are, therefore, at the same raised level, which is slightly above the normal level L.

Commencing at section line 4—4, in the representation shown in Fig. 1, the rail tread 9, it will be seen, tapers downwardly, as at 9', to a lower level, and continues thus across the intersection with rails 7, 7, and thereafter, it rises again to normal level at section line 4'—4'. The downward taper of said rail tread from 4—4, carries it from under the tread of the wheel after the weight has been taken by the flange of the wheel in the rail groove 8, thus preventing the wheel tread from engaging the intersecting rail heads or bodies. This constant battering of the wheel tread with the ends of the intersecting rails is what causes the noise and wear on the rails.

In Fig. 3, the normal level 9 of the rail tread and the bottom 8' of the rail groove is seen. In Fig. 4 the groove is seen filled in until the edge of the flange of the wheel and the tread of the wheel are both in engagement, respectively, with the groove and tread of the rail, while in Fig. 5, the wheel flange 11 is shown carrying the wheel, the rail tread being tapered downwardly from under the wheel tread, as at 9'.

It will thus be seen that my invention is without any moving or turning parts in a railway crossing, and that I have a construction and arrangement which eliminates the necessity of the wheel and its load being raised vertically at any time, for if the rail groove is filled in sufficiently to carry the wheel upwardly until its tread is free of the rail tread, there is increased load and friction, or if the tread of the rail is tapered down to the intersection, it must be tapered upwardly therefrom which also causes an increase in load and friction as the wheel and its load is again raised to the normal level of the rail tread.

I do not limit my invention to the details here shown, except as I may be limited by the hereto appended claim.

I claim:

A rail crossing consisting of standard rails having tread and groove portions extending across the intersection, the intersection gap being in width the same as the width of the groove in both directions, the bottoms of the intersecting grooves being flush with each other at their intersections and raised above the normal level of the rail groove, and the tops of the intersecting rail heads tapering downwardly as they approach the intersection to transfer the supporting contact of the wheel from its tread on the top of the rail to its flange in the bottom of the groove without any vertical movement of the wheel.

Signed at Los Angeles, Los Angeles County, California, this 9th day of January, 1931.

CLEON W. SYMONDS.